US012340372B2

(12) United States Patent
Niehaus

(10) Patent No.: US 12,340,372 B2
(45) Date of Patent: *Jun. 24, 2025

(54) SYSTEMS AND METHODS FOR USE IN FACILITATING APPLICATION OF SERVICES FOR PURCHASE TRANSACTIONS BASED ON TOKENS

(71) Applicant: MASTERCARD INTERNATIONAL INCORPORATED, Purchase, NY (US)

(72) Inventor: Bryan Niehaus, Clayton, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 976 days.

This patent is subject to a terminal disclaimer.

(21) Appl. No.: 17/409,494

(22) Filed: Aug. 23, 2021

(65) Prior Publication Data

US 2021/0383396 A1 Dec. 9, 2021

Related U.S. Application Data

(63) Continuation of application No. 15/235,817, filed on Aug. 12, 2016, now Pat. No. 11,100,505.

(51) Int. Cl.
*G06Q 20/40* (2012.01)
*G06F 16/9535* (2019.01)
(Continued)

(52) U.S. Cl.
CPC ..... *G06Q 20/4016* (2013.01); *G06F 16/9535* (2019.01); *G06Q 20/102* (2013.01);
(Continued)

(58) Field of Classification Search
CPC ...... G06Q 40/00; G06Q 20/40; G06Q 20/102; G06Q 20/382; G06Q 20/383; G06Q 20/385; G06Q 20/4016; G06F 16/9535
(Continued)

(56) References Cited

U.S. PATENT DOCUMENTS

2011/0154466 A1 6/2011 Harper et al.
2013/0018783 A1 1/2013 Ansari
(Continued)

OTHER PUBLICATIONS

Bank Identification Number—BIN (2016).
U.S. Appl. No. 15/235,817, filed Aug. 12, 2016, Bryan Niehaus.

*Primary Examiner* — Hani M Kazimi
(74) *Attorney, Agent, or Firm* — Harness, Dickey & Pierce, P.L.C.

(57) ABSTRACT

Disclosed are exemplary embodiments of systems and methods for facilitating services associated with transaction requests. In an exemplary embodiment, a method generally includes receiving, from a first entity, a transaction request for a payment account transaction. The transaction request includes a primary account number (PAN) for a payment account involved in the transaction. The exemplary method also includes overwriting the PAN in the transaction request with a non-PAN identifier (NPI), where a first segment of the PAN is identical to a first segment of the NPI and where the NPI is an invalid PAN. The exemplary method further includes routing the transaction request to a service, whereby the service is able to be implemented for the transaction request based, in part, on the first segment of the NPI while the PAN remains anonymous to the service.

20 Claims, 3 Drawing Sheets

(51) Int. Cl.
*G06Q 20/10* (2012.01)
*G06Q 20/38* (2012.01)

(52) U.S. Cl.
CPC ......... *G06Q 20/382* (2013.01); *G06Q 20/383* (2013.01); *G06Q 20/385* (2013.01); *G06Q 20/40* (2013.01)

(58) Field of Classification Search
USPC .......................................................... 705/40
See application file for complete search history.

(56) References Cited

U.S. PATENT DOCUMENTS

| | | |
|---|---|---|
| 2014/0032417 A1 | 1/2014 | Mattsson |
| 2015/0096046 A1 | 4/2015 | Mattsson et al. |
| 2015/0254577 A1 | 9/2015 | Sullivan |
| 2015/0302394 A1 | 10/2015 | Harper |
| 2018/0047024 A1 | 2/2018 | Niehaus |

SYSTEMS AND METHODS FOR USE IN FACILITATING APPLICATION OF SERVICES FOR PURCHASE TRANSACTIONS BASED ON TOKENS

CROSS-REFERENCE TO RELATED APPLICATION

This application is a continuation of U.S. patent application Ser. No. 15/235,817 filed on Aug. 12, 2016. The entire disclosure of the above application is incorporated herein by reference.

FIELD

The present disclosure generally relates to systems and methods for use in facilitating application of services (e.g., value added services, etc.) to purchase transactions based on use of tokens, or non-PAN identifiers (NPIs), and in particular, to systems and methods for use in assigning such tokens at least partially consistent with, but still different from, primary account numbers (PANs) associated with payment accounts used in the transactions, to thereby associate the desired services with the tokens and the underlying transactions without using the PANs.

BACKGROUND

This section provides background information related to the present disclosure which is not necessarily prior art.

Products (e.g., goods, services, etc.) are known to be offered for sale, and to be sold, by merchants in stores. Consumers are also known to purchase the products from the merchants, and fund corresponding purchase transactions at the merchants through use of payment accounts (also referred to as payment account transactions). In connection with such a purchase transaction, when a merchant submits an authorization request for the transaction to a payment account, an intermediate payment network is known to provide services in connection with the authorization request, including routing the authorization to the appropriate issuer, and further to provide fraud detection services, reward services, etc. Often, in the payment network, the services are imposed based on the primary account number (PAN) for the payment account used in the transaction, as included in the authorization request, being within one or more defined ranges. Conventionally, the first 6 digits of the PAN include a bank identification number (BIN), also referred to as an issuer identification number (IIN), which is typically issuer specific. As such, certain services imposed by the payment network for the purchase transaction, that are based on (or associated with) the issuer, may be properly implemented based on the BIN of the PAN included in the authorization request, or in other related requests (e.g., a clearing request, etc.) also handled by the payment network, being within one of the defined ranges.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
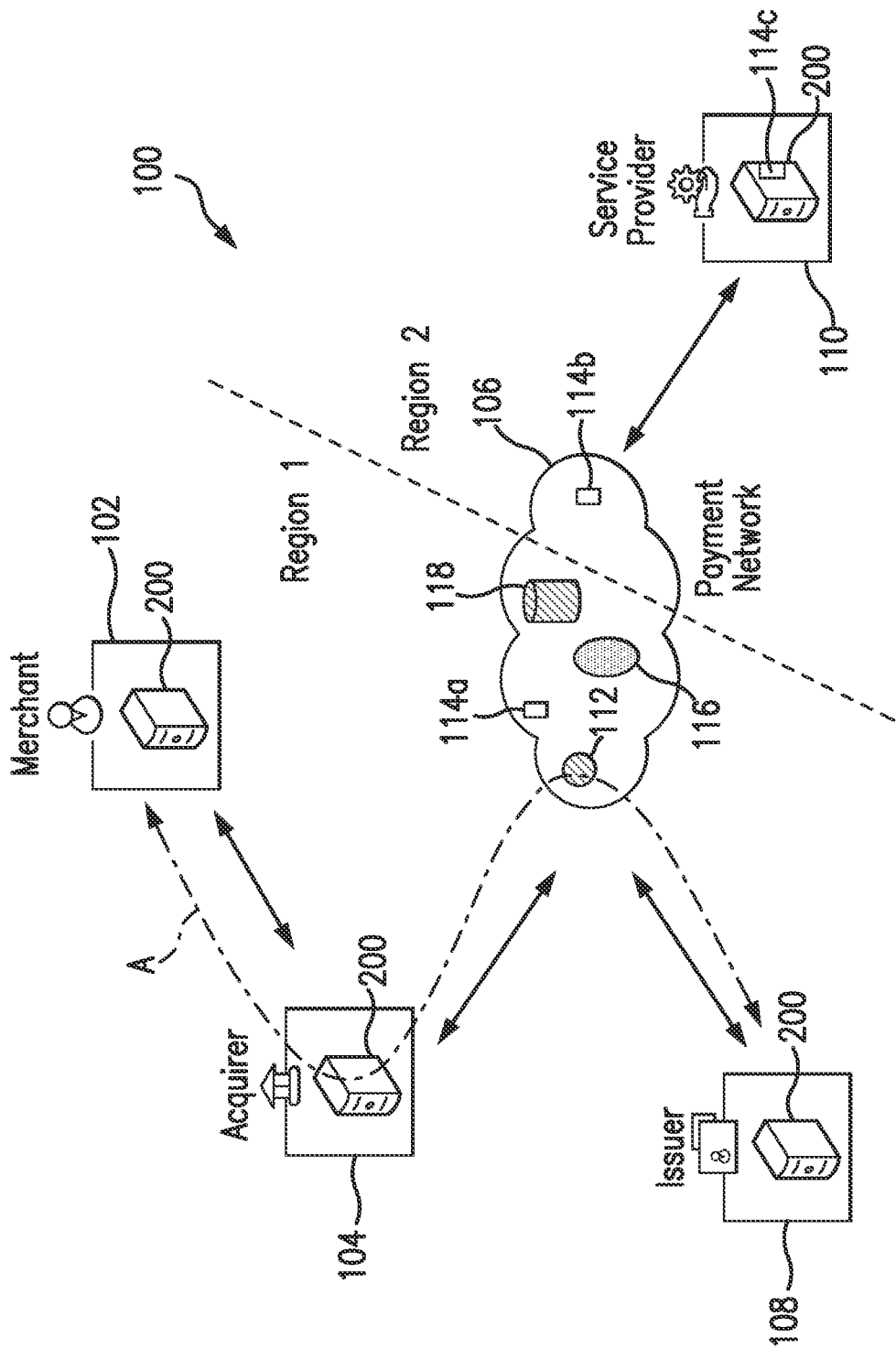
FIG. 1 is a block diagram of an exemplary system of the present disclosure suitable for use in facilitating imposition of services associated with payment network requests for purchase transactions, based on tokens associated with primary account numbers (PANs) for payment accounts used in the purchase transactions.

Exemplary embodiments will now be described more fully with reference to the accompanying drawings. The description and specific examples included herein are intended for purposes of illustration only and are not intended to limit the scope of the present disclosure.

When payment account transactions are submitted to payment networks for authorization, or later for clearing, for example, transaction requests associated with the transactions enter the payment networks and are routed/directed as appropriate to further the transactions (e.g., to appropriate issuers for approval, etc.), often based on business rules and/or logic included in the payment networks, relating to implementation of one or more services, etc. In connection therewith, when the services are in the regions in which the transactions are attempted, the services may be referred to as in-region or on-soil services, while services outside the regions may be referred to as out-of-region or off-soil services. In addition, or alternatively, privacy based or other control distinctions may exist between different services (regardless of in-region and/or out-of-region designations). Further, it is common for the transaction requests to include primary account numbers, or PANs, for consumer specific payment accounts involved in the transactions. The PANs may be used by the payment networks to identify the particular services to be implemented/imposed for the underlying transactions, for example, whether in-region or out-of-region, or whether privacy-based or not privacy-based, etc. Separately, security, privacy, and/or nationalism rules often prevent transmission of consumer-specific information, such as PANs, etc., in general (regardless of region) or more particularly to different regions (i.e., prevent such information from being routed off-soil) or different entities/services.

Uniquely, the systems and methods herein enable transaction requests to include tokens, or non-PAN indicators (NPIs), as replacements for the consumer-specific payment account information typically included (e.g., as replacements for PANs, etc.), while still allowing currently used business rules and/or logic included in the payment network to identify services therefore. In particular, a PAN included in a transaction request is mapped to an NPI, prior to routing the request to particular services, to out-of-region services, etc. The NPI is assigned to include a segment of the PAN (e.g., a first 5-11 characters thereof, etc.), and further to fail one or more PAN-specific validations (e.g., the Luhn algorithm, etc.). By preserving the segment of the PAN, certain services that are typically identified and imposed based on the PAN, will still be identified and imposed based on the token/NPI. Further, by assigning the PAN to fail the PAN-specific validation(s), the token/NPI will not be mistaken for, or attempted to be used as, a PAN (despite potentially having the same format and size, in some embodiments).

Accordingly, the token/NPI, as described herein, provides an effective alternative for the PAN, not identifiable to the consumer (i.e., not consumer specific and maintaining anonymity of the consumer) but still available to enable performance of the various PAN-based business rules and/or logic included in the payment network (for implementing desired services) without further modification thereof.

FIG. 1 illustrates an exemplary system 100 in which one or more aspects of the present disclosure may be implemented. Although, in the described embodiment, the system 100 is presented in one arrangement, other embodiments may include the system 100 arranged otherwise, depending, for example, on geographic dispersion of payment networks and/or services associated therewith and/or provided thereby, etc.

Referring to FIG. 1, the system 100 generally includes a merchant 102, an acquirer 104, a payment network 106, an issuer 108, and a service provider 110, each coupled to (and in communication with) one or more networks. The networks are represented by the solid arrowed lines in FIG. 1, and may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In addition, the multiple networks may be accessible to different ones of the illustrated parts in FIG. 1. In this example, a private payment transaction network is made accessible by the payment network 106 to the acquirer 104 and the issuer 108 and, separately, a public network (e.g., the Internet, etc.) is provided for communication between the merchant 102 and the acquirer 104 (e.g., via a website or via various network-based applications, etc.).

The illustrated system 100 is spread across two different regions, including region 1 and region 2 (separated by the dotted line in FIG. 1). The regions may include different cities, postal codes, states, territories, countries, or may be based on some other geographic delineation, etc. For purposes of illustration herein, region 1 and region 2 are countries, separated by a geographic border, where region 1 is governed by rules that prevent the transmission of consumer-specific information out of the region (e.g., to region 2, etc.). In this exemplary embodiment, the merchant 102, the acquirer 104, part of the payment network 106, and the issuer 108 are in region 1, while the other part of the payment network 106 and the service provider 110 are in region 2. It should be appreciated that, while only two regions are illustrated in FIG. 1 for ease of reference, multiple other regions may be included in the system 100 and/or in other system embodiments. It should also be appreciated that the present disclosure is not limited to regional divisions of services, and may be implemented in connection with privacy-based divisions of services (e.g., services that require consumer anonymity verses services that do not require consumer anonymity, etc.), control-based divisions, etc., where maintaining anonymity of a consumer is desired and/or required based on the particular service, the particular privacy-based requirement associated with the service, the particular control-based requirement associated with the service, etc.

Generally in the system 100, the merchant 102 offers products (e.g., goods and/or services, etc.) for sale to consumers (not shown). The consumers are associated with payment accounts, issued by the issuer 108 (and potentially by other issuers not shown), which may then be used to fund transactions for the products with the merchant 102.

In one example transaction, a consumer initiates a purchase of a product at the merchant 102 by presenting, to the merchant 102, a payment device associated with his/her payment account (issued by the issuer 108). In turn, the merchant 102 captures payment account information from the payment device (e.g., the PAN, expiration date, a card verification code (CVC), etc.) and then communicates an authorization request (e.g., including the payment account information, etc.) (or transaction request) (broadly, a transaction message) to the acquirer 104. The authorization request is transmitted along path A in the system 100, as referenced in FIG. 1. The acquirer 104 communicates the authorization request with the issuer 108, through the payment network 106, such as, for example, through MasterCard®, VISA®, Discover®, American Express®, etc., to determine whether the payment account is in good standing and whether there are sufficient funds and/or credit to cover the transaction. In turn, if approved, an authorization reply (indicating the approval of the transaction) (broadly, a transaction message) is transmitted back from the issuer 108 to the merchant 102, along path A, thereby permitting the merchant 102 to complete the transaction. The transaction is later cleared and/or settled by and between the merchant 102, the acquirer 104, and the issuer 108 (via appropriate authorization requests/replies, clearing requests/replies, etc. (or transaction requests/replies) (broadly, transaction messages)). If the transaction is declined, however, the authorization reply (indicating a decline of the transaction) is provided back to the merchant 102, along the path A, which then permits the merchant 102 to end the transaction, or seek other funding.

In connection with handling the transaction, the payment network 106 includes certain business rules and/or logic 112 that are applied to the transaction. The business rules and/or logic 112 represent one or more agreements between the acquirer 104, the payment network 106, and/or the issuer 108, for services to be provided to the authorization request for the transaction (and/or to other transaction messages for the transaction) and, potentially, to transaction messages relating to other transactions. It should be appreciated that any number of services may be provided for transaction messages (whether involving authorization requests, clearing requests, or other requests or replies), which are then identified and imposed by the business rules and/or logic 112. Some services may relate to authentication, while other services may relate to clearing, and still other services may relate to rewards and/or loyalty. With that said, example services may include, without limitation, fraud scoring services, card controls services, consumer notification services etc. Such fraud scoring services may be on-soil or off-soil, and may relate to fraud scoring for a particular payment card based on location, card present/not present, digital payments, dollar amounts, spend history etc., and/or may relate to fraud scoring to support an issuer risk level (e.g., where the issuer may have a range of cards that have high levels of authorization that are out of norm and therefore indicate a mass fraud event, etc.). Card controls services may be on-soil or off-soil, and may relate to enforcing card level controls such as spend limits (per week/month), limiting spend categories (e.g., only spend at food/restaurants and block spend on jewelry, etc.), etc. And, consumer notification services may be on-soil or off-soil, and may relate to notifying customers/consumers, when they make a transaction, that a transaction payment was made (e.g., "you just spent $10 at the merchant 102," etc.), that they earned reward points (e.g., "you just earned 100 points in rewards," etc.), that a transaction payment exceeded a defined threshold (e.g., "you just made a payment that exceeded your $150 threshold and you asked to be alerted," etc.).

Services, as represented by the business rules and/or logic 112, further may be internal to the payment network 106, or external. For example, the illustrated system 100 includes three exemplary services 114a-c. As shown in FIG. 1, two of the services 114a-b are internal to the payment network 106, while the third service 114c is external and provided by the service provider 110. It should be appreciated that any number of services may be included in the system 100, which are internal or external to the payment network 106, and/or are provided by the payment network 106, or are not provided by the payment network 106 (e.g., are provided by services providers, etc.). Also in the system 100, the service 114a is located in region 1, and thereby may be imposed on transaction requests in region 1 without reliance on any resources outside of region 1. Conversely, the services 114b-c are located in region 2, which thus require the transaction requests (or parts thereof), involving the merchant 102, to be transmitted out of region 1 to region 2 in order for the services 114b-c to be imposed. Again, it should be appreciated that services may be spread over any geographic region, or not, with services being located in one or more different regions, or within multiple regions (e.g., depending on the resources used by the service), etc. However, again, such regional separation of services is not required in all embodiments. For example, in some embodiments, services may be located in the same region, but one or more of the services (but not necessarily all) may require different levels of anonymity of consumers (or not) and/or may prohibit transfer of consumer-specific information thereto (or therefrom) (e.g., privacy-based distinctions, etc.).

As an example, in connection with the above transaction, the issuer 108 may contract with the payment network 106 to provide a fraud score, via a fraud service (e.g., via service 114b, etc.), for the transaction passing through the payment network 106 (and, potentially, for each other transaction associated with the issuer 108 and passing through the payment network 106). The business rules and/or logic 112, in response, are configured to intercept the authorization request (as it involves the payment account issued by the issuer 108) (e.g., conventionally, based on the PAN included in the request; etc.), when received at the payment network 106 (along path A) and direct it to the appropriate service 114b, which returns the authorization request with the fraud score included therein/appended thereto. The authorization request is then routed, by the business rules and/or logic 112, to the issuer 108, along path A.

As another example, in connection with the above transaction, the issuer 108 may contract with the service provider 110 to provide rewards for transactions involving payment accounts issued by the issuer 108, via service 114c. The business rules and/or logic 112, in response, are configured to intercept the authorization request (as it involves the payment account issued by the issuer 108) (e.g., again, conventionally, based on the PAN included in the request; etc.), when received at the payment network 106 (along path A) and direct it to the service provider 110 (e.g., to the service provider 110 associated with the service 114c, etc.), which facilitates the rewards service and then returns the authorization request (potentially with rewards data included therein) to the payment network 106. The authorization request is then routed, by the business rules and/or logic 112, to the issuer 108, along path A.

Transaction data is generated, collected, and stored as part of the above interactions among the consumer, the merchant 102, the acquirer 104, the payment network 106, the issuer 108, and the service provider 110. The transaction data represents at least a plurality of purchase transactions, for example, authorized transactions, cleared transactions, attempted transactions, etc. The transaction data, in this exemplary embodiment, is stored at least by the payment network 106 (e.g., in a data structure associated therewith, etc.). With that said, transaction data may include, for example, PANs, amounts of transactions, merchant IDs, merchant category codes (MCCs), dates/times of the transactions, products purchased and related descriptions or identifiers, etc. In addition, in connection with the present disclosure (and as described more hereinafter), transaction data may also include tokens, or non-PAN indicators (NPIs). It should be appreciated that more or less information related to transactions, as part of either authorization, clearing, and/or settling, may be included in transaction data and stored within the system 100, at the merchant 102, the acquirer 104, the payment network 106, the issuer 108, and/or the service provider 110.

In various exemplary embodiments, consumers involved in the different transactions herein are prompted to agree to legal terms associated with their payment accounts, for example, during enrollment in their accounts, etc. In so doing, the consumers may voluntarily agree, for example, to allow merchants, issuers, payment networks, service providers, etc., to use data collected during enrollment and/or collected in connection with processing the transactions, subsequently for one or more of the different purposes described herein.

While one merchant 102, one acquirer 104, one payment network 106, one issuer 108, and one service provider 110 are illustrated in FIG. 1, it should be appreciated that any number of these entities (and their associated components) may be included in the system 100, or may be included as a part of systems in other embodiments, consistent with the present disclosure.

Figure 2:
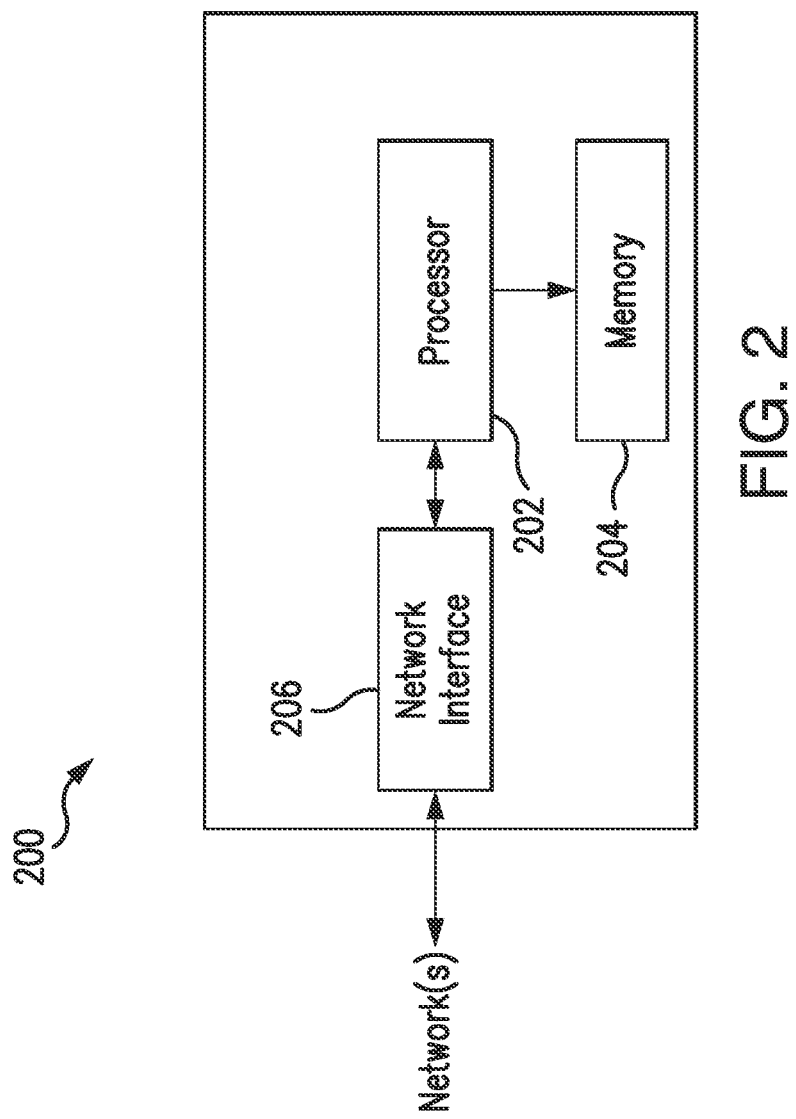
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, routers, personal computers, tablets, laptops, smartphones, PDAs, etc. In addition, the computing device 200 may include a single computing device, or it may include multiple computing devices located in close proximity or distributed over a geographic region, so long as the computing devices are specifically configured to function as described herein. In the exemplary system 100 of FIG. 1, each of the merchant 102, the acquirer 104, the issuer 108, and the service provider 110 are illustrated as including, or being implemented in, computing device 200, coupled to (and in communication with) one or more of the various networks in the system 100. In addition, the business rules and/or logic 112 and each of the services 114a-b included in the payment network 106 may be included in and/or implemented by one or more computing devices, consistent with computing device 200. Nonetheless, the system 100 should not be considered to be limited to the computing device 200, as described below, as different computing devices and/or arrangements of computing devices may be used. In addition, different components and/or arrangements of components may be used in other computing devices.

The exemplary computing device 200 generally includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may include one or more data structures, and may be configured to store, without limitation, transaction data (including PANs, NPIs, etc.), PAN-NPI mapping, consumer information, account ranges, and/or other types of data suitable for use as described herein. Furthermore, in various embodiments, computer-executable instructions may be stored in the memory 204 for execution by the processor 202 to cause the processor 202 to perform one or more of the functions/operations described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes or operations described herein.

In addition, the illustrated computing device 200 also includes a network interface 206 coupled to (and in communication with) the processor 202 and the memory 204. The network interface 206 may include, without limitation, a wired network adapter, a wireless network adapter, a mobile network adapter, or other device capable of communicating to/with one or more different networks. Further, in some exemplary embodiments, the computing device 200 includes the processor 202 and one or more network interfaces 206 incorporated into or with the processor 202.

Referring again to FIG. 1, the payment network 106 of the system 100 also includes a mapping engine 116 coupled to (and in communication with) a mapping data structure 118. The mapping data structure 118 may be included in memory, such as, for example, the memory 204 (in association with the mapping engine 116 or in association with another computing device, etc.). The mapping engine 116 is configured, often by computer-executable instructions, to perform the operations described herein. In connection therewith, the mapping data structure 118 includes multiple PAN-NPI pairs for payment accounts, which generally define an association and/or correspondence between the PAN for a given payment account and the NPI (i.e., the NPI as assigned to the PAN), etc., and which can be used by the mapping engine 116 to correlate the NPI for the given payment account to the PAN (and vice-versa). This will be described in more detail hereinafter.

More particularly in the illustrated embodiment, the mapping engine 116 is configured to intercept, at the payment network 106, for example, a transaction request (including a PAN for the payment account involved in the underlying transaction) directed to one or more out-of-region services (e.g., services 114b-c in FIG. 1, etc.) (although, in other embodiments, this may alternatively (or additionally) include intercepting transaction requests directed to particular services based on particular privacy concerns, controls, etc.). The mapping engine 116 is configured to then determine, based on the mapping data structure 118, whether an NPI has been assigned for the PAN included in the request. If an NPI has been assigned, the mapping engine 116 is configured to append the NPI, corresponding to the PAN, to the transaction request (thereby removing the PAN from the request). If an NPI has not been assigned, however, the mapping engine 116 is configured to assign an NPI to the PAN (and to store the NPI in the mapping data structure 118), and append the NPI to the transaction request (in place of the PAN). The mapping engine 116 is further configured to route the transaction request, with the NPI appended thereto, to the one or more out-of-region services 114b-c.

Subsequently, the mapping engine 116 is configured to receive the transaction request back from the one or more out-of-region services 114b-c, including one or more results associated with application of the corresponding services to the underlying transaction. In response, the mapping engine 116 is configured to append the PAN for the involved payment account, corresponding to the NPI, back to the transaction request (and remove the NPI), and then to provide/route the transaction request to one or more destinations, including, for example, the intended original recipient for the request such as the issuer 108, etc.

Figure 3:
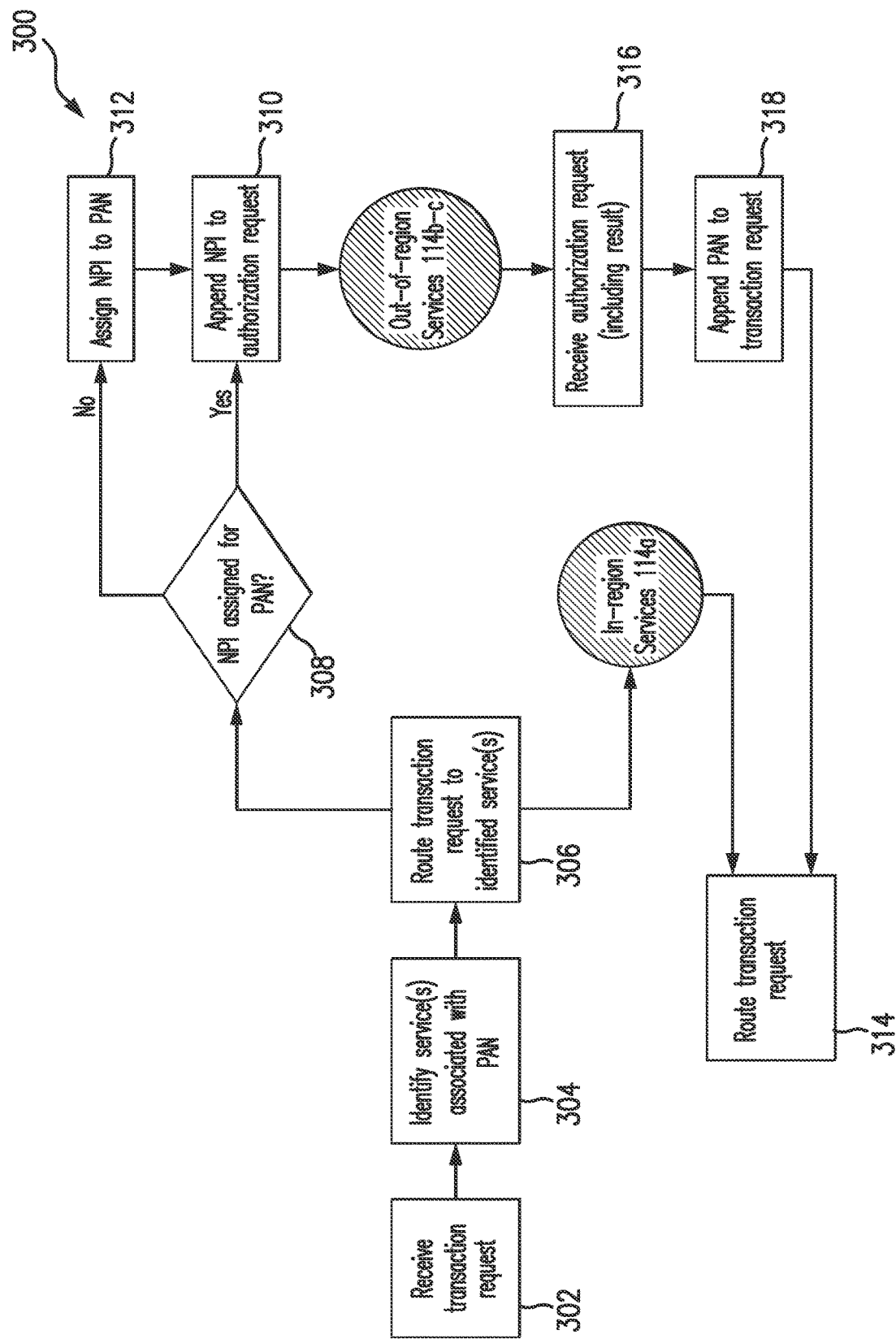
FIG. 3 is an exemplary method, which may be implemented in connection with the system of FIG. 1, for facilitating imposition of services, associated with the payment network requests for the purchase transactions, based on the tokens associated with the PANs.

FIG. 3 illustrates exemplary method 300 for facilitating imposition of services, associated with payment network requests, to transactions based on NPIs/tokens associated with PANs for payment accounts used in performing the transactions. In the exemplary embodiment, the method 300 is described with reference to the system 100, and in particular, to the services 114a-c, the mapping engine 116, and the mapping data structure 118, and further with reference to the computing device 200. It should be appreciated, however, that the methods herein are not limited to system 100 and the computing device 200, and that the systems and computing devices are not limited to method 300.

In describing the method 300, it should be appreciated that the payment network 106 and the issuer 108 have an agreement, which is imposed in the business rules and/or logic 112, that the payment network 106 will provide fraud service 114b to the issuer 108, by which a fraud score will be determined for each authorization request (broadly, transaction request) passing through the payment network 106 and involving a payment account issued by the issuer 108. In connection therewith, the fraud score is to be appended to the authorization request, prior to the authorization request being routed to the issuer 108, as described with reference to path A in FIG. 1.

Referring to FIG. 3, in response to a payment account transaction to the merchant 102, a transaction request is received, at 302, from the acquirer 104 (e.g., an authorization request such as described above in connection with the system 100, a clearing request, etc.). The transaction request includes a PAN, expiration date, and CVC relating to the payment account used in the transaction, and potentially additional information regarding the merchant 102 (e.g., merchant ID, merchant location, MCC, etc.) and the transaction (e.g., time, amount, etc.) (all broadly, transaction data). In one example, the PAN included in the transaction request is 1234-1234-1234-1234, which includes the BIN 1234-12 corresponding to the issuer 108. Upon receipt of the transaction request at the payment network 106 (e.g., along path A in the system 100, etc.), the business rules and/or logic 112 identifies, at 304, the issuer 108 based on the BIN 1234-12 and, as a result, the particular services to be imposed on the transaction request (and underlying transaction). In this example, based on the agreement with the issuer 108, the business rules and/or logic 112 identifies (at 304) that the out-of-region fraud score service 114b is the desired service, and then routes, at 306, the transaction request to the fraud score service 114b.

In so doing, and prior to the transaction request actually being transmitted to the out-of-region fraud score service 114b (since the fraud score service 114b is an out-of-region service), the mapping engine 116 intercepts the transaction request and determines, at 308, whether an NPI is already assigned for the PAN included in the transaction request. More specifically, the mapping engine 116 accesses the mapping data structure 118, and searches in the mapping data structure 118 for the PAN.

If the PAN is found in the mapping data structure 118, the mapping engine 116 appends, at 310, the corresponding NPI (as retrieved from the mapping data structure 118) to the transaction request and directs the transaction request to the service 114b. It should be appreciated that, often, the mapping engine 116 overwrites the PAN with the NPI, whereby the NPI is appended to the transaction request and the PAN is removed in one operation. If the NPI is appended to the transaction request at a location other than in place of the PAN (e.g., in a different data element of the request, etc.), the mapping engine 116 operates to then remove the PAN from the transaction request, thereby making the transaction request non-specific to a consumer and/or the payment account associated with the PAN.

Conversely, if an NPI has not been assigned to the PAN (such that the PAN is not identified in the mapping data structure 118 (at 308)), the mapping engine 116 assigns, at 312, an NPI to the PAN, and then stores the NPI-PAN pair in the mapping data structure 118.

As part of assigning the NPI to the PAN (at 312), the mapping engine 116 may compile the NPI based on the PAN (e.g., compile an individual NPI for the PAN, etc.). This may include assigning a segment of the PAN (or PAN segment) as the NPI, or as a portion of the NPI. For example, the NPI may include a first five characters of the PAN (broadly, a first segment of the PAN), a first six characters of the PAN (i.e., the BIN for the PAN) (broadly, a first segment of the PAN), a different number of characters from the PAN (e.g., depending on a granularity needed or desired for PAN-identified services, etc.) in combination with other characters (e.g., numbers, letters, etc.), etc. In another example, the NPI may include a first 7-11 digits/characters of the PAN (broadly, a first segment of the PAN). In any case, different ranges of PANs, even within the same BIN, may be delineated by the NPI. Specifically, for a sixteen-digit PAN, if the issuer 108 dissects the BIN 1234-12 (i.e., the first six digits of the PAN) into four ranges (e.g., platinum, gold, silver, general, etc.), as defined in Table 1, it is apparent that at least the first 8 characters of the PAN may be reproduced in the NPI, so that the NPI is able to delineate between the four different ranges. That is, regardless of the form of the NPI, in this example, as long as the first 8 characters are included, the NPI would be identified to the same account range as the corresponding PAN.

TABLE 1

| BIN | Range | Status |
|---|---|---|
| 1234-12 | 00-0000-0000 to 00-9999-9999 | Platinum Account |
| 1234-12 | 01-0000-0000 to 04-9999-9999 | Gold Account |
| 1234-12 | 05-0000-0000 to 39-9999-9999 | Silver Account |
| 1234-12 | 40-0000-0000 to 99-9999-9999 | General Account |

It should be appreciated that the PAN segment, and specifically the number of characters or digits representing the PAN segment, that is included in the NPI may be different in other embodiments, depending, for example, on the number of ranges into which one or more issuers define for their BINs or group of BINs, or PANs, etc. In addition, in at least one embodiment, the payment network 106 may impose a limitation on account ranges/segments to include the first eleven digits of a PAN, such that including the first eleven digits of the PAN in the NPI covers all issuers associated with the payment network 106. Typically, though, such generation of the NPI (individually, or when generating a pool of NPIs) will include changing more than just a last digit of the PAN, to help ensure that the resulting NPI(s) is/are considered anonymous.

Further in this aspect, upon assigning the first segment of the PAN to the NPI (at 312), the mapping engine 116 assigns the remaining characters of the NPI, often resulting in the NPI having the same size and format as the PAN (e.g., sixteen digits, etc.) (although this is not required in all embodiments (e.g., the NPI could include more than sixteen characters, such as nineteen characters, etc.; less than sixteen characters; etc.)). The remaining characters are selected, by the mapping engine 116, to ensure that the NPI fails at least one validation test of a PAN in the payment network 106. For example, conventionally, when the transaction request is submitted by the merchant 102 to the acquirer 104, the PAN is validated through use of at least one validation algorithm (e.g., the Luhn algorithm, etc.). Specifically, such validation may include (e.g., at the payment network 106, at the issuer 108, etc.) validating a checksum associated with the PAN (e.g., the last digit of the PAN, etc.). As such, if the PAN fails the validation, the payment account transaction is halted and returned. In assigning the NPI, the mapping engine 116 employs one or more validation algorithms, to ensure that the NPI fails this conventional validation, and as a result is not able to be mistaken for the PAN (and not inadvertently processed by the payment network 106, the issuer 108, other parts of the system 100, etc. as the PAN). The mapping engine 116, as such, in assigning the remaining characters of the NPI, may select a next available NPI and check the NPI against at least one validation algorithm (e.g., the Luhn algorithm, etc.). If the validation fails, the NPI is assigned. However, if the assigned NPI passes the validation, a next sequent NPI is then selected or compiled and assigned, and its validation is checked. The mapping engine 116 continues this process until an NPI is assigned that fails the validation.

Alternatively, as part of assigning the NPI to the PAN (at 312), the mapping engine 116 may select the NPI from a pool of NPIs generated in advance (or ahead of time). The pool of NPIs may be generated in the manner described above, or in other manners, and will typically be based on a desired/defined account range (which includes the consumer's PAN). In so doing, the selected/assigned NPI from the pool is then performed in a random manner, and the NPI is generally ensured of being a valid NPI/invalid PAN at the time of assignment (such that the additional operations of checking the NPI against at least one validation algorithm and potentially regenerating the NPI (if it passes the validation) need not be performed).

With continued reference to FIG. 3, once an acceptable NPI is assigned to the PAN (at 312), as described above, the mapping engine 116 appends, at 310, the assigned NPI to the transaction request and directs the transaction request to the service 114b.

It should be appreciated that, if the in-region service 114a had been identified by the business rules and/or logic 112 (at 304), instead of the out-of-region service 114b, the transaction request would have alternatively been routed, by the mapping engine 116 (at 306), directly to the service 114a (without appending an NPI). This is because, since the transaction request remains in-region for the service 114a, masking consumer specific details in the request may not be necessary. But whether in-region services or out-of-region services are identified, the transaction request ultimately ends up at the particular service identified by the business rules and/or logic 112 at 304 (i.e., either at the in-region service 114a, or the out-of-region services 114b-c as illustrated in FIG. 3). And, the appropriate one of the services 114a-c is then performed, as is conventional.

Generally in the method 300, in performing the various services 114a-c, the services often rely on either the PAN or the NPI included in a transaction request (alone or as falling within a particular range), to determine particular implementations and/or variations of the services 114a-c to be imposed on the underlying transaction (i.e., based on further business rules and/or logic, etc.). As an example, the different payment accounts identified in Table 1 may be subject to different variations of the services 114a-c (e.g., because of status, etc.). The in-region service 114a, when identified at 304, relies on the PAN to determine any variation in the service (as an NPI need not be assigned/appended for such in-region service 114a). In connection therewith, if the in-region service 114a relates to authentication, the service 114a may identify a PAN as being within the silver account range (having PANs ranging from 1234-1205-0000-0000 to 1234-1239-9999-9999) and apply appropriate authentication requirements to the transaction. Likewise, the out-of-region service 114b, when identified at 304, relies on the NPI to determine any variations of the fraud score service to impose on the underlying transaction (and associated transaction data). In this example, in assigning the NPI to the PAN, the mapping engine 116 may have preserved the first 11 digits of the PAN (i.e., 1234-1234-123-_____) so that the NPI (like the PAN) is within the silver account range. As such, even without the PAN, the service 114b is able to identify the account range for the payment account, and thus the appropriate variation of the service 114b to be applied, based on the NPI.

It should be appreciated that by preserving a segment of the PAN, in the NPI, as described, the services 114a-c may be able to treat a transaction request including the NPI in the same manner as those including the PAN, with the appropriate variations on the services, per account range. As such, the appropriate scope of the services 114a-c can be identified and applied to appropriate transactions (and corresponding payment accounts), regardless of whether services are in-region or out-of-region services, without modification.

Once the appropriate one of the services 114a-c is performed, the service returns the transaction request to the mapping engine 116. And, the mapping engine 116 routes the transaction request, at 314, to the intended designation (e.g., the intended original recipient for the request such as the issuer 108, etc.). For the service 114a, upon completion, the mapping engine 116 routes the transaction request (at 314) directly to the intended designation (with the result of the service 114a potentially appended to the transaction request). In some embodiments, upon completion of the service 114a (or upon completion of other ones of the services 114b-c), the mapping engine 116 may make a decision regarding the transaction request on behalf of the intended designation (e.g., on behalf of the issuer 108, etc.), for example, approving or declining the underlying transaction, etc. Here, then, a response message (e.g., an authorization reply, etc.) may be generated at the payment network 106 and transmitted to the acquirer 104 and the merchant 102 (e.g., along path A in FIG. 1 as described above, etc.), with the mapping engine 116 (or the payment network 106) notifying the issuer 108 of such result/action.

However, for the services 114b-c, upon completion, the mapping engine 116 initially receives the transaction request, at 316, from the services 114b-c with the result of the particular service appended thereto. For example, the service 114b may append a fraud score to the transaction request, such that the transaction request received by the mapping engine 116 includes the fraud score, or broadly, the result of the service. Then, the mapping engine 116 appends the PAN to the transaction request, at 318. More specifically, the mapping engine 116 again accesses the mapping data structure 118, and searches in the mapping data structure 118 for the NPI. In turn, the mapping engine 116 identifies the corresponding PAN in the mapping data structure 118, and appends the PAN, corresponding to the NPI in the mapping data structure 118, to the transaction request. The NPI may then be removed from the transaction request by the mapping engine 116. And, like above, the transaction request is routed, at 314, to its intended designation.

In the exemplary method 300, and as described with reference to the above example, the business rules and/or logic 112 route the transaction request to certain services 114a-c, or not, whereby the services, when applicable, are in-line with the handling of the transaction request. As such, the services 114a-c are typically completed before the transaction request is permitted to proceed (at 314), for example. It should be appreciated, however, that the business rules and/or logic 112 may route the transaction request (or part thereof) to the desired services 114a-c, while simultaneously permitting the transaction request to proceed (at 314), for example, whereby the services 114a-c are completed in parallel with further handling of the transaction request, or even after a response to the transaction request has been provided. The results of the services may then be subsequently appended to the transaction request, or not. This may involve services such as, for example, account controls services (e.g., where the service involves notifying a consumer that he/she has made a payment transaction meeting certain criteria, etc.), or reward services (e.g., where the service involves notifying a consumer that he/she has earned rewards, etc.).

In view of the above, the systems and methods herein enable a token (also referred to as an NPI), to be used to impose services on a transaction request, while obscuring any personal information potentially associated with a PAN for a payment account involved in the underlying transaction. In connection therewith, the token is non-specific to any consumer. As such, the transaction request, when including the token, is suitable to be routed to any service, including an out-of-region service, while abiding by any relevant restrictions on transmitting consumer-specific information out of a region in which the transaction was initiated. Further, despite being non-specific to the consumer (outside of the payment network 106), the token uniquely retains a segment of the PAN, whereby the service to which the transaction request is to be routed can still identify the particular service requirements to be applied for the underlying payment account (based on the token). Thus, use of the token (or NPI) as described herein helps avoid violation of any restrictions on transmitting consumer-specific information, while still maintaining implementation of appropriate scopes of services.

Further, while not intended in this description (and unlikely to occur), it is possible that a transaction request including an NPI may be forwarded outside of the payment network 106 (or the service provider 110) to the acquirer 104, the issuer 108, or another entity. In such an instance, the transaction request would be non-specific to a consumer, and therefore would pose limited risk to the consumer upon such transmission. Further, when received at the issuer 108, for example, validation of the NPI, as is conventional, would fail as described above (because the NPI is not the PAN). As such, the issuer 108 would return the transaction request to the payment network 106, indicating the error. More generally, even if a transaction request including an NPI is received by the issuer 108, with the NPI potentially having the same size and format as the PAN, since the NPI is not the PAN it would not be linked to any account issued by the issuer 108. Therefore errant handling of the NPI would pose little risk.

It should be appreciated that the method 300, while described in connection with in-region and out-of-region services (as a distinction between the services), is also applicable to services that are distinguished based on privacy requirements/concerns and/or control requirements (e.g., distinctions of the services based on whether or not anonymity of consumers is required and/or potentially a degree of anonymity required, etc.), etc. Here, for example, when the mapping engine 116 intercepts authorization requests directed to services requiring consumer anonymity (whether in-region or not), the mapping engine 116 may append appropriate NPIs to the authorization requests (e.g., at 310 in the method 300, etc.). Alternatively, when the mapping engine 116 intercepts authorization requests directed to services not requiring consumer anonymity (again, whether in-region or not), the mapping engine 116 may simply route the authorization requests to the services (without appending NPIs to the authorization requests).

It should also be appreciated that the functions described herein, in some embodiments, may be described in computer executable instructions stored on a computer readable media, and executable by one or more processors. The computer readable media is a non-transitory computer readable media. By way of example, and not limitation, such computer-readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should further be appreciated that one or more aspects of the present disclosure transform a general-purpose computing device into a special-purpose computing device when configured to perform the functions, methods, and/or processes described herein.

With that said, and as will be appreciated based on the foregoing specification, the above-described embodiments of the disclosure may be implemented using computer programming or engineering techniques including computer software, firmware, hardware or any combination or subset thereof, wherein the technical effect may be achieved by: (a) receiving, from a first entity, a transaction request for a payment account transaction, the transaction request including a primary account number (PAN) for a payment account involved in the transaction; (b) overwriting the PAN in the transaction request with a non-PAN identifier (NPI), a first segment of the PAN being identical to a first segment of the NPI, and the NPI being an invalid PAN; (c) routing the transaction request to a service, whereby the service is able to be implemented for the transaction request based, in part, on the first segment of the NPI while the PAN remains anonymous to the service; (d) upon completion of the service: (i) receiving, from the service, the transaction request with the NPI included therein; (ii) overwriting the NPI in the transaction request with the PAN; and (iii) routing the transaction request to an issuer; (e) compiling the NPI based on the PAN included in the transaction request; (f) checking the NPI against at least on validation algorithm; (g) assigning the NPI to the PAN when the NPI fails the at least one validation algorithm, prior to overwriting the PAN in the transaction request with the NPI; and (h) randomly selecting the NPI from a pool of NPIs.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating services associated with transaction requests, the method comprising:
   receiving, by at least one computing device disposed in a first region, via an acquirer computing device, from a merchant disposed in the first region, a transaction request for a transaction involving the merchant, the transaction request including a primary account number (PAN) for a payment account involved in the transaction, wherein the first region restricts transmission of the PAN to at least one different region;
   identifying, by the at least one computing device, an out-of-region service for the transaction request based on a first segment of the PAN, the first segment of the PAN associated with an issuer of the payment account;
   in response to the identified out-of-region service:
      identifying, by the at least one computing device, a non-PAN identifier (NPI) for the PAN, wherein the NPI includes a first segment identical to the first segment of the PAN, and wherein the NPI is an invalid PAN, as defined by at least one PAN validation algorithm;
      overwriting, by the at least one computing device, the PAN in the transaction request with the NPI, whereby the PAN is removed from the transaction request; and then
      after overwriting the PAN in the transaction request, routing, by the at least one computing device, the transaction request including the NPI to a computing device associated with the out-of-region service, which is located in the at least one different region, across a geographic border of the first region, whereby the PAN remains confined to the first region and the out-of-region service is implemented for the transaction request based on the NPI; and
   receiving, at the at least one computing device, back from the computing device associated with the out-of-region service, the transaction request including the NPI and at least one output of the out-of-region service;
   overwriting, by the at least one computing device, the NPI in the transaction request with the PAN; and
   routing the transaction request, with the at least one output of the out-of-region service, to the issuer.

2. The computer-implemented method of claim 1, wherein the out-of-region service includes a fraud score service; and
   wherein the at least one output of the out-of-region service includes a fraud score.

3. The computer-implemented method of claim 1, wherein the first segment of the PAN and the first segment of the NPI each include between five and seven characters; and
   wherein the PAN and the NPI each include a same number of characters.

4. The computer-implemented method of claim 3, wherein the first segment of the PAN and the first segment of the NPI each include at least eleven digits.

5. The computer-implemented method of claim 1, wherein the NPI is identified directly to the PAN, but un-identified directly to a consumer associated with the payment account.

6. The computer-implemented method of claim 1, further comprising:
   compiling the NPI based on the PAN included in the transaction request; and
   assigning the NPI to the PAN, prior to identifying the NPI for the PAN.

7. The computer-implemented method of claim 1, wherein identifying the NPI includes randomly selecting, by the at least one computing device, the NPI from a pool of NPIs; and
   wherein each of the NPIs in the pool is compiled based on a range of PANs, each PAN in the range of PANS including the first segment of the PAN.

8. The computer-implemented method of claim 1, wherein identifying the NPI for the PAN includes:
   compiling the NPI based on the PAN; and
   confirming the NPI is an invalid PAN, based on at least one PAN validation algorithm, prior to overwriting the PAN.

9. The computer-implemented method of claim 1, wherein receiving the transaction request from the merchant includes receiving the transaction request from the merchant, via an acquirer associated with the merchant.

10. A system for use in facilitating services associated with transaction requests while maintaining consumer-specific payment account information unidentifiable to the services, the system comprising:
   a memory disposed in a first region and including a mapping data structure, the mapping data structure including multiple primary account numbers (PANs) for payment accounts and multiple non-PAN identifiers (NPIs), each NPI corresponding to a single one of the multiple PANs and including a first segment of the PAN, said first segment including a bank identification number (BIN) for an issuer associated with the PAN, and each NPI being an invalid PAN, as defined by at least one PAN validation algorithm; and
   a first computing device in communication with the data structure, the first computing device disposed in the first region and being configured to:
      receive, from a merchant, via an acquirer computing device of an acquirer associated with the merchant, a transaction request for a payment account transaction involving the merchant, the transaction request including a PAN for a payment account involved in the payment account transaction;
      determine whether the transaction request is directed to a service at a second computing device disposed in at least one different region, based on a BIN included in the PAN, wherein the PAN is subject to a restriction from being transmitted to the at least one different region;
      when the transaction request is directed to the service at the second computing device disposed in the at least one different region, identify the NPI from the mapping data structure corresponding to the PAN based on a search in the mapping data structure for the PAN included in the transaction request;
      overwrite the PAN in the transaction request with the NPI from the mapping data structure corresponding to the PAN, whereby the PAN is removed from the transaction request; and after overwriting the PAN in the transaction request, route the transaction request with the NPI to the service at the second computing device, which is disposed in the at least one different region, across a geographic border of the first region, whereby the second computing device disposed in the at least one different region relies on the NPI to implement provide the service for the transaction request, while the PAN remains confined to the first region and is anonymous to the service at the second computing device.

11. The system of claim 10, wherein the first segment includes a first eleven digits or less of the PAN.

12. The system of claim 10, wherein the first computing device is further configured to:
compile the NPI based on the PAN;
confirm the NPI is invalid based on a PAN validation algorithm; and
assign the NPI to the PAN in the mapping data structure.

13. The system of claim 12, wherein the PAN validation algorithm is defined by a Luhn algorithm.

14. The system of claim 10, wherein the first computing device is further configured to:
select the NPI from a pool of NPIs, prior to overwriting the PAN with the NPI to the transaction request, when the PAN is not included in the mapping data structure; and
wherein each of the NPIs in the pool is compiled based on a range of PANs having the same first segment.

15. The system of claim 10, wherein the first computing device is further configured to:
receive the transaction request from the second computing device associated with the service, after transmitting the transaction request to the second computing device, wherein the received transaction request includes an output of the service; and then
append, to the received transaction request, the PAN corresponding to the NPI; and then
transmit the received transaction request, with the output of the service and the PAN, to an issuer of the payment account within the first region.

16. A non-transitory computer-readable storage medium including executable instructions for facilitating services associated with transaction requests, which when executed by a processor disposed in a first region, cause the processor to:
receive, via an acquirer computing device of an acquirer associated with a merchant, a transaction request for a payment account transaction from a first computing device in the first region, the transaction request including a primary account number (PAN) for a payment account involved in the transaction;
identify a service for implementation to the transaction request, based on the PAN;
when a second computing device including the identified service is disposed in a second region, different than the first region, such that the identified service is out-of-region relative to the first computing device in the first region and the merchant associated with the transaction request, identify a non-PAN identifier (NPI) for the PAN, a first segment of the NPI being identical to a first segment of the PAN, the NPI being an invalid PAN, as defined by at least one PAN validation algorithm;
overwrite the PAN in the transaction request with the NPI, whereby the PAN is removed from the transaction request; and
after overwriting the PAN in the transaction request, route the transaction request to the second computing device in the second region, thereby submitting the transaction request to the identified service in the second region without the PAN whereby the PAN remains confined to the first region.

17. The non-transitory computer-readable storage medium of claim 16, wherein the transaction request includes an authorization request; and
wherein the first segment of the PAN includes a bank identification number (BIN) specific to an issuer of the payment account.

18. The non-transitory computer-readable storage medium of claim 17, wherein the executable instructions, when executed by the processor, further cause the processor to:
receive the transaction request from the second computing device, the received transaction request including at least one output of the identified service; and then
overwrite the NPI with the PAN corresponding to the PAN; and
transmit the received transaction request, with the at least one output of the identified service and the PAN, to an issuer of the payment account.

19. The non-transitory computer-readable storage medium of claim 17, wherein the executable instructions, when executed by the processor, cause the processor, in order to identify the NPI, to:
search in a data structure for the PAN included in the transaction request; and
in response to the PAN not being in the data structure:
compile the NPI based on the PAN;
assign the NPI to the PAN; and
store the PAN and NPI in the data structure.

20. The non-transitory computer-readable storage medium of claim 17, wherein the executable instructions, when executed by the processor, cause the processor, in order to identify the NPI, to:
search in a data structure for the PAN included in the transaction request; and
in response to the PAN not being in the data structure, select the NPI from a pool of NPIs having the identical first segment of the PAN and assign the NPI to the PAN.

* * * * *